United States Patent
Matsunaga et al.

(10) Patent No.: US 8,957,276 B2
(45) Date of Patent: Feb. 17, 2015

(54) METHOD OF PROCESSING WASTE MATERIAL

(75) Inventors: Takehiro Matsunaga, Tsukuba (JP); Ken Okada, Tsukuba (JP); Miyako Akiyoshi, Tuskuba (JP); Shiyuu Usuba, Tsukuba (JP); Masaya Ueda, Kobe (JP); Koichi Hayashi, Kobe (JP); Kiyoshi Asahina, Kobe (JP)

(73) Assignees: National Institute of Advanced Industrial Science and Technology (JP); Kobe Steel, Ltd. (JP)

( * ) Notice: Subject to any disclaimer, the term of this patent is extended or adjusted under 35 U.S.C. 154(b) by 315 days.

(21) Appl. No.: 12/662,938

(22) Filed: May 12, 2010

(65) Prior Publication Data

US 2010/0292525 A1 Nov. 18, 2010

(30) Foreign Application Priority Data

May 13, 2009 (JP) ................................ 2009-116354

(51) Int. Cl.
*B01D 11/00* (2006.01)
*F23J 15/00* (2006.01)
*C22B 7/00* (2006.01)
*C22B 43/00* (2006.01)

(52) U.S. Cl.
CPC ................. *C22B 7/002* (2013.01); *C22B 7/005* (2013.01); *C22B 43/00* (2013.01)

USPC ............. 588/404; 588/406; 423/40; 110/203; 110/345

(58) Field of Classification Search
None
See application file for complete search history.

(56) References Cited

U.S. PATENT DOCUMENTS

| | | | |
|---|---|---|---|
| 5,744,690 A * | 4/1998 | Yokoyama et al. | 588/316 |
| 6,260,464 B1 * | 7/2001 | Gorrell et al. | 86/50 |
| 2002/0030022 A1 * | 3/2002 | Bradley | 210/752 |
| 2003/0097953 A1 * | 5/2003 | Serizawa et al. | 102/531 |
| 2004/0009095 A1 * | 1/2004 | Giletto et al. | 422/28 |
| 2005/0192472 A1 * | 9/2005 | Quimby et al. | 588/321 |
| 2006/0067862 A1 * | 3/2006 | Herbst | 422/186.21 |

FOREIGN PATENT DOCUMENTS

JP 2000-167395 6/2000

* cited by examiner

*Primary Examiner* — Melvin C Mayes
*Assistant Examiner* — Sheng H Davis
(74) *Attorney, Agent, or Firm* — Studebaker & Brackett PC; Donald R. Studebaker

(57) ABSTRACT

An aspect of the present invention is a method of processing a waste material that contains mercury or a mercury compound, and chlorine or a mercury chloride, the method including a step of adding a chlorine scavenger to the waste material, and stowing the waste material in a treatment vessel; and a step of subjecting the waste material to a blasting treatment by fitting an explosive to the treatment vessel and detonating the explosive inside a pressure-proof container.

8 Claims, 1 Drawing Sheet

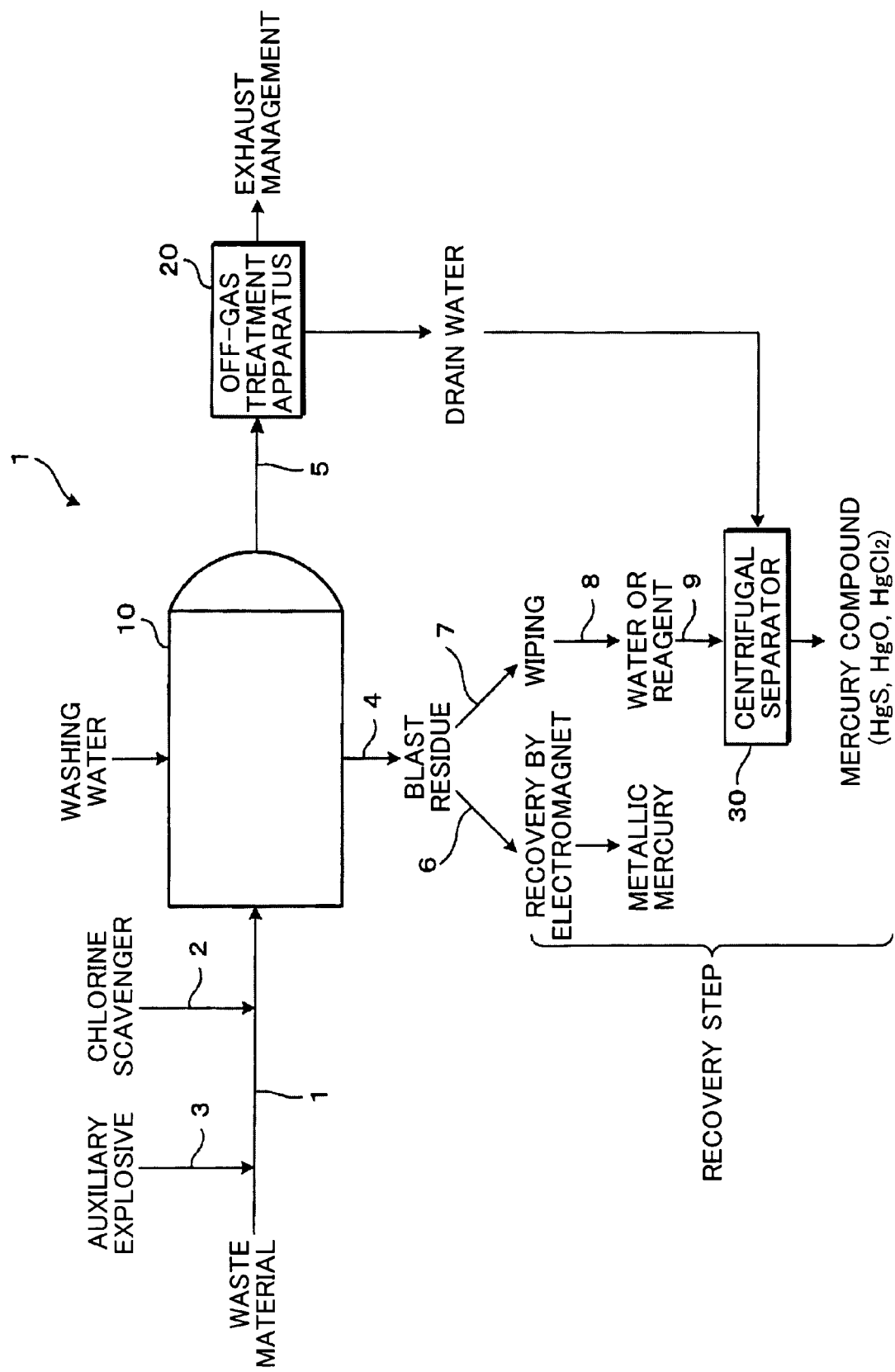

METHOD OF PROCESSING WASTE MATERIAL

BACKGROUND OF THE INVENTION

1. Field of the Invention

The present invention relates to a method of processing waste material, and more particularly to a method of processing waste material that is contaminated with, for instance, mercury compounds.

2. Description of the Related Art

Known conventional methods for disposing of mercury-containing waste material by incineration involve using washing towers or activated carbon filters for treating the mercury. In washing tower methods mercury must be washed by being converted into mercury chloride (II), which is a water-soluble compound. A supplementary process is therefore required for this conversion. Although the mercury recovery rate in this treatment method is as high as 90% and is comparatively high, the conversion product, mercury chloride (II), is highly toxic. Mercury and chlorine bind easily to each other, to form readily mercury chloride (II) that is soluble in water and ethanol. This is problematic in that the mercury must be recovered once more from the washing water in which the mercury chloride (II) had been recovered. Meanwhile, methods that employ activated carbon filters are likewise problematic in that effective mercury recovery is difficult, and 100% mercury recovery cannot be achieved. Other recovered mercury compounds besides mercury chloride (II) may also be toxic, depending on the form of the mercury compound in question.

Further conventional methods that have been proposed involve the use of adsorbents for treating toxic substances, such as dioxines, that are generated in waste incinerators. Disclosed methods for regenerating spent adsorbents, in the case where the spent adsorbent used for toxic substance removal contains mercury, involve subjecting the mercury-containing spent adsorbent to a thermal treatment in a nitrogen atmosphere at an atmosphere temperature of 300° C., to remove mercury and the like from the adsorbent into a gas (for instance, Japanese Patent. Application Laid-open No. 2000-167395). The treatment method disclosed in Japanese Patent Application Laid-open No. 2000-167395, however, has a problem that the mercury removed from the adsorbent cannot be recovered efficiently and safely from the gas.

SUMMARY OF THE INVENTION

It is an object of the present invention to provide a method of processing a waste material that allows recovering efficiently and safely toxic substances in the waste material, by detonating a explosive that is fitted to the waste material, inside a blasting container.

An aspect of the present invention is a method of processing a waste material that contains mercury or a mercury compound, and chlorine or a mercury chloride, the method comprising the steps of adding a chlorine scavenger to the waste material, and stowing the waste material in a treatment vessel; and subjecting the waste material to a blasting treatment by fitting an explosive to the treatment vessel and detonating the explosive inside a pressure-proof container.

The objects, features, aspects and advantages of the present invention will be made more apparent on the basis of the detailed explanation below and accompanying drawings.

BRIEF DESCRIPTION OF THE DRAWINGS

FIG. 1 is an explanatory diagram illustrating the schematic configuration of a blasting treatment facility where a blasting treatment is performed using a method of processing waste material according to an embodiment of the present invention.

DESCRIPTION OF THE PREFERRED EMBODIMENTS

As the waste material containing a mercury compound, the inventors came to focus on mustard, which is a kind of chemical material that is still ongoingly being disposed of. Mercury chloride (II) ($HgCl_2$) that was used as a catalyst during the synthesis of the chemical material is left in this mustard. The present invention is based on findings of investigations relating to the state of the mercury compound after a blasting treatment of this mustard.

An embodiment of the method of processing waste material according to the present invention will be explained below with reference to accompanying drawings.

First, with reference to FIG. 1, an explanation is provided on an example of a blasting treatment facility where the blasting treatment is performed in accordance with the method of processing waste material according to the present embodiment. FIG. 1 is an explanatory diagram illustrating the schematic configuration of the blasting treatment facility. As illustrated in FIG. 1, the blasting treatment facility 1 comprises mainly a blast-proof vessel (pressure-proof container) 10, an off-gas treatment apparatus 20 for treating gas after the blasting treatment, and a centrifugal separator for separating the mercury component comprised in carbon dust after the blasting treatment.

The blast-proof container 10 is a pressure-proof container having an explosion-proof structure formed of steel or the like, and is built so as to withstand blast pressure during the blasting treatment of the waste material in the interior. The blast-proof container 10 comprises a detachable pressure-proof lid, and is constructed in such a manner that the waste material can be charged into the container by removing the pressure-proof lid from the container main body. The waste material is charged into a vessel that is fixed inside the blast-proof container 10 by way of a fixing means. The interior of the container becomes then sealed when the above pressure-proof lid is fitted to the main body, so that the waste material can be blasted inside the blast-proof container 10 in a sealed state.

The blast-proof container 10 is provided with a plurality of inlet ports that allow introducing, for instance, air, water and detergents into the blast-proof container 10, and with drain ports for draining of waste liquid, in operations that precede and follow the blasting treatment. Outside the blast-proof container 10 there is provided a firing device to initiate detonation of the explosive placed inside the container, in such a manner that the blasting treatment can be performed remotely.

An explanation follows next on treatment steps 1 to 6 of treating the waste material in the above-described blasting treatment facility 1.

(Step 1)

Firstly, a waste material containing mercury or a mercury compound, and chlorine or a mercury chloride, is stowed in the treatment vessel (arrow 1 in FIG. 1).

The mercury compound may be, for instance, an inorganic mercury compound such as $HgCl_2$, $HgCl$, $Hg_2Cl_2$ or $HgO$, or an organic mercury compound such as $(CH_3)_2Hg$ or the like. The mercury chloride may be, for instance, $HgCl_2$, $HgCl$ or $Hg_2Cl_2$. The method of processing waste material according to the present embodiment, specifically, can be used for treating waste material that contain mercury or compounds comprising mercury atoms, and chlorine or compounds comprising chlorine atoms. In particular, the mercury compounds such as $HgCl_2$, $HgCl$ and $Hg_2Cl_2$ are concurrently the mercury chlorides that comprise mercury atoms and chlorine atoms, and hence the method of processing the waste material according to the present embodiment can be used for treating the waste material containing the mercury compounds alone.

Preferably, the treatment vessel used is made of a thin material, for instance PET bottles, and does not generate toxic substances as a result of the blasting treatment, in terms of reducing the amount of secondary waste material.

A chlorine scavenger is added together with the waste material into the treatment vessel (arrow 2 in FIG. 1). The chlorine scavenger undergoes preferential chemical reactions with chlorine atoms contained in the waste material, and as a result, the chlorine atoms are trapped by the chlorine scavenger during the below-described blasting treatment. This allows preventing the formation of mercury chloride (II) resulting from recombination of chlorine atoms generated in the blasting treatment with mercury atoms that are comprised in the waste material.

The chlorine scavenger is, preferably, a nitrate of an alkaline metal, for instance potassium nitrate ($KNO_3$) or sodium nitrate ($NaNO_3$). By adding these alkaline metal salts as the chlorine scavengers, mercury chlorides such as $HgCl_2$, $HgCl$ and $Hg_2Cl_2$ comprised in the waste material can react chemically with potassium nitrate ($KNO_3$) or sodium nitrate ($NaNO_3$), as triggered by the blasting treatment. As a result, potassium chloride (KCl) or sodium chloride (NaCl) having as low toxicity as possible can be recovered as a compound after the blasting treatment. For instance, when the mercury compound comprised in the waste material is mercury chloride (II) which is highly toxic, the chlorine in the mercury chloride (II) can be converted into other low-toxicity substances, such as potassium chloride (KCl) or sodium chloride (NaCl), by being recovered through reaction with the alkaline metal.

An amount of the chlorine scavenger added to the waste material is preferably set to be equal to or greater than the amount required for complete recovery of the chlorine atoms in the waste material through reaction of these chlorine atoms with the chlorine scavenger. The amount of alkaline metal in the chlorine scavenger is preferably set so as to allow recovering the total amount of chlorine in the mercury compound, for instance mercury chloride (II), and of chlorine in other chlorine compounds (MCl) comprised in the waste material. Specifically, as shown in the chemical reaction formulas (1) and (2) below, when the amounts of the chlorine compound (MCl) and mercury chloride (II) are assumed to be 1 mole each, the amount of potassium nitrate ($KNO_3$) as the chlorine scavenger is preferably set to be not smaller than 3 moles.

Specifically, the addition amount of potassium nitrate ($KNO_3$) is preferably calculated on the basis of the calculation formulas (3) and (4) below. In practice, preferably, the respective substance amounts (moles) of the chlorine compound (MCl) and the mercury chloride (II) are estimated, and then the addition amount (g) of the chlorine scavenger is set in accordance with the estimated substance amount (moles).

$$2KNO_3 + HgCl_2 \rightarrow 2KCl + Hg+ \quad (1)$$

$$KNO_3 + MCl \rightarrow KCl + M+ \quad (2)$$

(Addition amount (g) of $KNO_3$/molecular mass of $KNO_3$):($HgCl_2$ content (g) in waste material/ molecular mass of $HgCl_2$)=2:1 (3)

(Addition amount (g) of $KNO_3$/molecular mass of $KNO_3$):(MCl content (g) in waste material/molecular mass of MCl)=1:1 (4)

In the present embodiment, preferably, a sulfur compound is further added to the waste material, in addition to the chlorine scavenger. The sulfur compound is added to exploit the tendency of mercury atoms to react readily with other atoms after the blasting treatment, in particular the tendency of mercury atoms to bind comparatively readily with sulfur (S) to form mercury sulfide (HgS), the toxicity of which is fairly low. That is, adding the sulfur compound allows actively promoting the generation of low-toxicity mercury sulfide, as a compound after the blasting treatment.

Specific examples of the sulfur compound include, for instance, 2-chloroethylethylsulfide (hereafter, "CEES" for short), sulfuric acid and the like. If used with care on account of its toxicity, the mustard (bis(2-chloroethyl)sulfide) itself may also be used as the sulfur compound in the present embodiment. Using the method of processing the waste material according to the present embodiment to treat the waste material that contains the mustard is preferable, since in this case the mustard can be used as the sulfur compound at the same time.

(Step 2)

Next, an auxiliary explosive (explosive) is fitted to the treatment vessel that holds the waste material, a detonator is connected to the auxiliary explosive, and the detonator is connected to a firing wire (arrow 3 in FIG. 1). The method for stowing the above-described chlorine scavenger, or the chlorine scavenger having added thereto the above sulfur compound, in the treatment vessel together with the waste material may involve, for instance, incorporating such a chlorine scavenger beforehand into the auxiliary explosive, and then stowing the auxiliary explosive into the treatment vessel together with the waste material, in addition to stowing directly such a chlorine scavenger together with the waste material in the treatment vessel.

(Step 3)

Next, the treatment vessel is fitted inside the blast-proof container 10, with the pressure-proof lid thereof removed from the container main body. Thereafter, the pressure-proof lid is fitted to the main body, to seal thereby the interior of the blast-proof container 10.

(Step 4)

Next, the auxiliary explosive fitted in the treatment vessel is detonated, to blast the waste material. Through blasting, organic toxic substances and the like present in the waste material are decomposed to the atom level. The components thus decomposed remain inside the blast-proof container 10 in the form of a gas mainly containing hydrogen, carbon monoxide, carbon dioxide and the like, or in the form of a blast residue containing unburned carbon.

The mercury compounds such as mercury chloride (II) or the like are likewise decomposed to the atom level. The decomposed components recombine then with chlorine, sulfur, oxygen or the like that bind readily with the components. When the addition amount of the chlorine scavenger is set to a sufficient amount as described above, the chlorine present in the blasting treatment system combines preferentially with the alkaline metal in the chlorine scavenger. This allows precluding the formation of mercury chloride (II) through recombination of the chlorine and mercury.

As illustrated in the below-described examples, the ratio of migration of mercury into the gas during the above blasting treatment is very small, which is about 0.007% with respect to the mercury present in the waste material before the blasting treatment. Most of the mercury, thus, remains as a blast residue in the blast-proof container 10 (arrow 4 in FIG. 1). The blast residue can be divided into unburned carbon dust derived from organic substances, and other metallic residues. The blast residue contains metallic mercury (Hg) as well as mercury compounds such as mercury sulfide (HgS), mercury oxide (HgO) and the like.

(Step 5)

The post-blasting gas generated in the blasting treatment is subjected to an off-gas treatment in the off-gas treatment apparatus 20 (arrow 5 in FIG. 1). The mercury level in the gas resulting from the blasting treatment is extremely low, and hence it is very unlikely that any mercury is emitted into the atmosphere. The pressure-proof lid of the blast-proof container 10 is opened after the post-blasting gas is treated.

(Step 6)

Next, the blast residue is recovered from inside the blast-proof container 10. Here, an explanation is provided on a method for recovering mercury compounds and metallic mercury from the blast residue through a combination of a recovery step using an electromagnet (step 6-1 below), and a recovery step using a centrifugal separator (step 6-2 below).

(Step 6-1)

The metallic mercury in the blast residue becomes magnetized as a result of the blasting treatment, and hence can be easily recovered using an electromagnet (arrow 6 in FIG. 1). As a metallic container for recovering the metallic mercury, the metallic container which does not form amalgams is preferably used.

(Step 6-2)

The mercury compounds in the blast residue tend to remain on the inner wall of the blast-proof container 10, and hence the surface of the inner wall is wiped thoroughly with a cloth or the like (arrow 7 in FIG. 1). The cloth used for wiping is washed with water or a reagent (arrow 8 in FIG. 1), so that, after the mercury compounds have migrated to the water or reagent, the mercury compounds are recovered by processing the water or reagent in a centrifugal separator (arrow 9 in FIG. 1). The molecular mass difference between mercury compounds is substantial, and thus the mercury compounds can be separated using the centrifugal separator.

EXAMPLES

The present invention will be explained in detail below on the basis of examples. The present invention, however, is not limited to these examples.

Tests were carried out in the examples by focusing on mustard, which is a kind of chemical material that is still ongoingly being disposed of, as the waste material containing a mercury compound. Mercury chloride (II) ($HgCl_2$) that was used as a catalyst during the synthesis of the chemical material is left in the mustard. In the examples there was used CEES, which is an organic substance that simulates the mustard chemical material.

For reference, Table 1 summarizes the acute toxicity of the mercury compounds illustrated in the above-described embodiment.

TABLE 1

| Acute toxicity of mercury compounds | | | | |
|---|---|---|---|---|
| Mercury compound | State | Allowable concentration | Acute toxicity ($LD_{50}$) | Remarks |
| $HgCl_2$ | Crystal/Powder | 0.025 mg/m$^3$ | Rat (oral) 1 mg/kg | Highest toxicity in this list |
| HgO | Powder | 0.025 mg/m$^3$ | Rat (oral) 18 mg/kg | |
| $(CH_3)_2Hg$ | Liquid | 0.01 mg/m$^3$ | Rat (oral) 26 mg/kg | |
| Hg | Liquid | 0.025 mg/m$^3$ | Human (oral) 43 mg/kg | |
| HgCl | Solid | 0.025 mg/m$^3$ | Rat (oral) 210 mg/kg | Decomposes readily into mercury chloride (II) and mercury when exposed to light |
| $Hg_2Cl_2$ | Powder | / | Rat (oral) 210 mg/kg | |
| HgS | Powder | No applicable data | / | Non-toxic |

Among the mercury compounds given in Table 1, mercury chloride (II) ($HgCl_2$) is suggested to be the most toxic mercury compound. Although $HgCl_2$ was used in the examples as the mercury compound, $HgCl$ or $Hg_2Cl_2$ may also be used, instead of $HgCl_2$, and the treatment method according to the present embodiment can also be applied for these mercury compounds.

Next, the experimental conditions that were applied in the examples are explained in detail.

(Waste Material and Mercury Compound)

The organic compound CEES, simulating the chemical material mustard, was used as the toxic waste material. CEES was subjected to a blasting treatment in a state where CEES contained mercury chloride (II) ($HgCl_2$) as the mercury compound. Table 2 sets out the molecular formulas of mustard and CEES. As Table 2 shows, both mustard and CEES comprise sulfur (S).

TABLE 2

Chemical formulas of mustard and CEES

| Substance | Chemical formula | Melting point(° C.) | Boiling point(° C.) | Molecular mass | Vapor pressure |
|---|---|---|---|---|---|
| Mustard (generated mustard) | $Cl(CH_2)_2S(CH_2)_2Cl$ (Liquid) | 13 to 14 | 217 | 159.08 | 9.6 Pa/20° C. (0.072 mmHg) |
| CEES | $Cl(CH_2)_2S(CH_2CH_3)$ (Liquid) | No applicable data | | 156 | 124.63 5300 Pa/73° C. |

The experimental conditions that were applied in the Examples and Comparative example are given in Table 3 below.

($HgCl_2$)

As Table 3 shows, the amount of mercury chloride (II) ($HgCl_2$) contained in CEES was set to 0.6 g, which is amenable for quantitative determination.

(Explosive)

As Table 3 shows, the amount of high explosive (PETN) added to CEES was set, in the light of findings obtained to date, to a weight ratio of 1:1 relative to CEES.

(Chlorine Scavenger)

Potassium nitrate ($KNO_3$) as the chlorine scavenger was added to CEES in the addition amount indicated in Table 3, such that all the chlorine in the blasting treatment system is recovered. More specifically, the addition amount (1.1 g) was set so as to allow all the chlorine comprised in CEES and in mercury chloride (II) to trap as the chloride.

(Oxygen)

Adding oxygen to CEES allows increasing the decomposition ratio of CEES and reducing the amount of unburned carbon in the blast residue. Therefore, the amount of oxygen was set to be as large as possible, as indicated in Table 3.

Comparative Example

A blasting treatment was carried out under conditions identical to those of the Example above, but without adding the chlorine scavenger and oxygen to CEES (Comparative example in Table 3), in order to check the difference vis-à-vis Examples (Examples 1 and 2 in Table 3) where the blasting treatment was performed with the chlorine scavenger and oxygen added to CEES.

TABLE 3

Experimental conditions

| | Units | Comparative example 1 | Example 1 | Example 2 | Remarks |
|---|---|---|---|---|---|
| PETN (high explosive) | g | 1 | 1 | 1 | NEQ (TNT basis): 1.2 |
| CEES (simulant | g | 1 | 1 | 1 | PETN NEQ/CEES = 1.2 PETN NEQ: Penthrite |

TABLE 3-continued

| | Units | Comparative example 1 | Example 1 | Example 2 | Remarks |
|---|---|---|---|---|---|
| for generated mustard) | | | | | NEQ |
| $HgCl_2$ | g | 0.59 | 0.61 | 0.6 | $HgCl_2$/CEES = 60 wt % |
| (mercury generation) | g | (0.44) | (0.45) | (0.44) | |
| $KNO_3$ (g) (Chlorine scavenger) | g | 0 | 1.1 | 1.1 | $KNO_3$/Total Cl = 1 |
| Oxygen | mol | 0 | 0.077 | 0.061 | Amount of oxygen supplied when blasting vessel empty |

(Experiment Results)

The gas components and the mercury amount in the gas were measured after the blasting treatment. The measurement results are given in Table 4. As Table 4 shows, the ratio of the amount of mercury in the gas after the blasting treatment with respect to the amount of mercury comprised in the waste material before the blasting treatment was no greater than 0.007%, which indicated that virtually no mercury had migrated into the gas inside the blast-proof container 10, and thus the amount of mercury in the gas was small. Most of the mercury is therefore assumed to remain in the form of the blast residue.

TABLE 4

| | | | Gas component in explosion product | | | |
|---|---|---|---|---|---|---|
| Sample extract | Analysis target | Units | Comparative example 1 | Example 1 | Example 2 | Remarks |
| Gas | $H_2$ | vol % | 19 | 15 | 19 | |
| | $O_2$ | vol % | 0.32 | 0.13 | <0.1 | |
| | $N_2$ | vol % | 15 | 14 | 13 | |
| | $CH_4$ | vol % | 3.6 | 0.67 | 1.1 | |
| | CO | vol % | 41 | 38 | 43 | |
| | $CO_2$ | vol % | 12 | 38 | 28 | |
| | $H_2S$ | vol % | 2 | 1.2 | 1.4 | |
| | HCl | ppm | 370 | 8 | 22 | |
| | NO | ppm | <5 | <5 | <5 | |
| | $NO_2$ | ppm | <25 | <25 | <25 | |
| | $SO_2$ | ppm | 5 | 0.3 | 0.6 | |
| | T-Hg (Gas) | μg/L | 0.94 | 7.33 | 7.54 | |
| | Gas Volume | L | 2.28 | 3.76 | 4.01 | |
| | T-Hg (Gas) | μg | 2.14 | 27.56 | 30.24 | |
| | Transferring Rate | | 0.0005% | 0.0062% | 0.0068% | |

The results show that the method of processing the waste material in the present embodiment allows suppressing migration of mercury into the gas in the blast-proof container by subjecting CEES (waste material) containing mercury chloride (II) to the blasting treatment in the blast-proof container 10, and indicate therefore that most mercury can be recovered easily from the blast residue.

As shown in Table 5, which gives the recovery results of mercury as the sum total of mercury in dust, plus mercury recovered by wiping and mercury recovered by a magnet, the recovery rate within the blast residue was 81% and 84%.

TABLE 5

Recovered amount of total mercury comprised in blast residue

| Analysis target | | Units | Comparative example 1 | Example 1 | Example 2 | Remarks |
|---|---|---|---|---|---|---|
| In dust | T-Hg (A) | mg/kg | 10,300 | 15,500 | 14,100 | |
| | T-Dust (B) | mg | 6,785 | 8,814 | 7,759 | |
| | T-Hg in Dust (C) = (A) × (B) | mg | 70 | 137 | 109 | |
| Wipe T-Hg (D) (mercury recovered by wiping) | | mg | 156 | 238 | 250 | |
| Recovered Metal Hg by Cu (E) (metallic mercury recovered by magnet) | | mg | 1.86 | 1.22 | 1.79 | |
| Recovery rate (E)/(G) | | | 0.42% | 0.27% | 0.40% | |
| Total recovered Hg (amount of total mercury recovered) (F) = (C) + (D) + (E) | | mg | 228 | 376 | 361 | |
| Original Hg (G) | | mg | 439 | 448 | 444 | |
| Recovery rate (H) = (F)/(G) | | | 52% | 84% | 81% | |

Since mercury chloride (II) is soluble in ethanol, mercury chloride (II) in the blast residue was extracted with ethanol, and the amount of mercury chloride (II) in the original blast residue was measured by measuring the mercury concentration in the ethanol liquid extract. The measurement results are given in Table 6. As Table 6 shows, the generation of mercury chloride (II) through recombination of mercury with chlorine was significantly suppressed when the chlorine scavenger was used (Examples 1 and 2 in Table 6), as compared with a case where no chlorine scavenger was used (Comparative example 1 in Table 6). This result is thought to arise from the dramatic decrease in the amount of chlorine available for recombination with mercury, since chlorine reacts preferentially with the chlorine scavenger ($KNO_3$).

TABLE 6

Amount of mercury chloride (II) and organic mercury compound

| Analysis target | Units | Comparative example 1 | Example 1 | Example 2 | Remarks |
|---|---|---|---|---|---|
| T-Hg (Total mercury) | mg/kg | 10,300 | 15,500 | 14,100 | |
| Recovered T-Hg by ethanol (total mercury recovered with ethanol) ($HgCl_2$) | mg/kg | 9,150 | 525 | 600 | |
| Recovery rate | | 89% | 3.4% | 4.3% | |
| Organic mercury | mg/kg | <100 | <100 | <100 | |

Thus, according to the method of processing the waste material in the present embodiment, chlorine comprised in CEES and mercury chloride (II) can be caused to undergo chemical reactions with the nitrate of an alkaline metal (chlorine scavenger) such as potassium nitrate ($KNO_3$) or sodium nitrate ($NaNO_3$). As a result, the substances which are as innocuous and low-toxicity as possible can be recovered in the form of potassium chloride (KCl), sodium chloride (NaCl) or the like. Further, since this chemical reaction proceeds preferentially, the bonding between chlorine and mercury can be precluded. Recombination of chlorine and mercury into highly toxic mercury chloride (II) can be avoided as a result.

In terms of generation energy, mercury sulfide forms readily under the experimental conditions when a reduction state is brought about in the presence of the chlorine scavenger.

Metallic mercury present on the inner walls after blasting is visible as balls formed on account of surface tension. The magnetism of this metallic mercury is reversed, and hence the mercury can be recovered using a magnet. According to the method of processing the waste material in the present embodiment, thus, the blast induces magnetic reversal in mercury, so that mercury in the blast residue can be recovered easily from the blast residue.

As explained above, an aspect of the present invention is a method of processing a waste material that contains mercury or a mercury compound, and chlorine or a mercury chloride, the method comprising the steps of adding a chlorine scavenger to the waste material, and stowing the waste material in a treatment vessel; and subjecting the waste material to a blasting treatment by fitting an explosive to the treatment vessel and detonating the explosive inside a pressure-proof container.

In the above configuration, the waste material containing mercury or a mercury compound, and chlorine or a mercury chloride, is subjected to the blasting treatment inside the pressure-proof container, as a result of which migration of the mercury into the gas inside the pressure-proof container can be suppressed, and hence most mercury can be recovered easily from the blast residue. Moreover, the magnetism of mercury can be reversed on account of the blasting treatment, and thus mercury can be recovered easily from the blast residue. Further, the blasting treatment triggers also chemical reactions between chlorine in the waste material and the chlorine scavenger. As a result, substances that are as innocuous and low-toxicity as possible can be recovered in the form of compounds generated by the blasting treatment, while preventing at the same time recombining of chlorine with mercury. Generation of extremely toxic mercury chlorides can be avoided thereby.

Preferably, a sulfur compound is further added to the chlorine scavenger in the step of stowing the waste material in the treatment vessel.

The tendency that the mercury after the blasting treatment binds comparatively readily with sulfur is exploited by further adding the sulfur compound to the waste material, to actively elicit thereby the formation of mercury sulfide (HgS). This allows as a result recovering the substance that are as innocuous and low-toxicity as possible, in the form of the compound generated by the blasting treatment.

Preferably, the chlorine scavenger is at least one selected from the group consisting of potassium nitrate and sodium nitrate.

Adding to the waste material the nitrate of the alkaline metal such as potassium nitrate, sodium nitrate or the like as the chlorine scavenger allows chlorine compounds such as $HgCl_2$, $HgCl$ and $Hg_2Cl_2$, comprised in the waste material, to react chemically with the potassium nitrate ($KNO_3$) or sodium nitrate ($NaNO_3$), as a result of which compounds having as low a toxicity as possible, in the form of potassium chloride (KCl) or sodium chloride (NaCl), can be recovered after the blasting treatment.

Preferably, the amount of the chlorine scavenger that is added to the waste material is equal to or greater than an amount required for complete recovery of chlorine in the waste material through the chemical reaction of the chlorine and the chlorine scavenger.

That way, all the chlorine in the waste material can be made to react chemically with the chlorine scavenger through the blasting treatment. Combination of chlorine with mercury can be reliably averted as a result, and generation of extremely toxic mercury chlorides can be reliably suppressed as well.

Preferably, the waste material contains a mustard (bis(2-chloroethyl)sulfide). Since the mustard is used also as the sulfur compound above, performing the blasting treatment on a waste material containing the mustard allows recovering the substance that are as innocuous and low-toxicity as possible, in the form of the compound generated after the blasting treatment.

Preferably, the sulfur compound is at least one selected from the group consisting of 2-chloroethylethylsulfide and sulfuric acid. These-sulfur compounds can actively induce the formation of mercury sulfide (HgS) through reaction with the mercury after the blasting treatment.

Preferably, the chlorine scavenger or the chlorine scavenger having the sulfur compound added thereto is incorporated beforehand into the explosive, and the explosive is stowed in the treatment vessel together with the waste material. By performing the blasting treatment on the waste material that is stowed in the treatment vessel together with the explosive into which such a chlorine scavenger has been incorporated beforehand, the chlorine trapping effect elicited by the chlorine scavenger or the mercury sulfide generation effect elicited by the sulfur compound can be brought out more effectively.

The embodiments of the present invention have been explained with reference to drawings, but it should be noted that the specific features of the invention are in no way meant to be limited to the above embodiments. The scope of the invention is defined not only by the explanation of the above illustrative embodiments but by the scope of the appended claims, and encompasses all modifications that fall within the spirit and scope of the claims and equivalents thereof.

This application is based on Japanese patent application No. 2009-116354, filed in Japan Patent Office on May 13, 2009, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A method of processing a waste material that contains mercury or a mercury compound, and chlorine or a mercury chloride, the method comprising the steps of:
    before a blasting treatment and before placing an explosive in a treatment vessel, adding a chlorine scavenger to the waste material in an amount that is equal to or greater than an amount required for complete recovery of chlorine in the waste material through a chemical reaction of the chlorine and the chlorine scavenger;
    stowing the waste material in the treatment vessel;
    placing the explosive in the treatment vessel; and
    subjecting the waste material to a blasting treatment including detonating the explosive inside a pressure-proof container, wherein the chlorine scavenger prevents chlorine atoms generated in the blasting treatment from recombining with mercury atoms contained in the waste during the blasting treatment.

2. The method of processing the waste material according to claim 1, wherein a sulfur compound is further added to the chlorine scavenger in the step of stowing the waste material in the treatment vessel.

3. The method of processing the waste material according to claim 1, wherein the chlorine scavenger is at least one selected from the group consisting of potassium nitrate and sodium nitrate.

4. The method of processing the waste material according to claim 1, wherein the waste material contains a mustard (bis(2-chloroethyl)sulfide).

5. The method of processing the waste material according to claim 2, wherein the sulfur compound is at least one selected from the group consisting of 2-chloroethylethylsulfide and sulfuric acid.

6. The method of processing the waste material according to claim 1, further comprising a step of recovering, by means of an electromagnet, metallic mercury in a blast residue within the pressure-proof container and/or metallic mercury adhered to an inner wall of the pressure-proof container after the blasting treatment.

7. The method of processing the waste material according to claim 1, wherein mercury chloride is not generated during the blasting treatment.

8. The method of processing the waste material according to claim 1, wherein before adding the chlorine scavenger, the method further comprising determining an amount of chlorine scavenger to be added which is equal to or greater than the amount required for complete recover of the chlorine in the waste material through a chemical reaction of the chlorine and the chlorine scavenger.

* * * * *